(12) United States Patent
Begin et al.

(10) Patent No.: US 6,532,419 B1
(45) Date of Patent: Mar. 11, 2003

(54) CALIBRATION OF MULTI-AXIS ACCELEROMETER IN VEHICLE NAVIGATION SYSTEM

(75) Inventors: John David Begin, Sterling Heights, MI (US); Ka C. Cheok, Rochester Hills, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 0 days.

(21) Appl. No.: 09/159,164

(22) Filed: Sep. 23, 1998

(51) Int. Cl.$^7$ .......................... G01C 21/16; G01C 21/20
(52) U.S. Cl. .................... 701/220; 701/207; 701/210; 701/217
(58) Field of Search .................... 701/200, 207, 701/210, 217, 220, 221; 73/1.77; 33/324

(56) References Cited

U.S. PATENT DOCUMENTS

| | | |
|---|---|---|
| 3,442,140 A | 5/1969 | Pelteson |
| 3,492,465 A | 1/1970 | Buscher et al. |
| 3,588,478 A | 6/1971 | Anthony |
| 3,597,598 A | 8/1971 | McAllister et al. |
| 3,610,900 A | 10/1971 | Talwani |
| 3,702,477 A | 11/1972 | Brown |
| 3,763,358 A | 10/1973 | Cargille |
| 3,790,766 A | 2/1974 | Brown |
| 3,803,387 A | 4/1974 | Lackowski |
| 3,924,824 A | 12/1975 | Brodie et al. |
| 4,038,527 A | 7/1977 | Brodie et al. |
| 4,070,674 A | 1/1978 | Buell et al. |
| 4,135,155 A | 1/1979 | Kehl et al. |
| 4,173,784 A | 11/1979 | Heath et al. |
| 4,262,861 A | 4/1981 | Goldstein |
| 4,542,647 A | 9/1985 | Molnar |
| 4,692,765 A | 9/1987 | Politis et al. |
| 4,713,767 A | 12/1987 | Sato et al. |
| 4,749,157 A | 6/1988 | Neufeld |
| 4,758,959 A | 7/1988 | Thoone et al. |
| 4,800,501 A | 1/1989 | Kinsky |
| 4,823,626 A | 4/1989 | Hartmann et al. |
| 4,870,588 A | 9/1989 | Merhav |
| 4,930,085 A | 5/1990 | Kleinschmidt |
| 5,001,647 A | 3/1991 | Rapiejko et al. |
| 5,166,882 A | 11/1992 | Stambaugh |
| 5,172,323 A | 12/1992 | Schmidt |
| 5,301,114 A | 4/1994 | Mitchell |
| 5,301,130 A | 4/1994 | Alcone et al. |
| 5,339,684 A | 8/1994 | Jircitano et al. |
| 5,355,316 A | 10/1994 | Knobbe |
| 5,442,560 A | 8/1995 | Kau |
| 5,450,345 A | 9/1995 | Raymer et al. |
| 5,479,161 A | 12/1995 | Keyes et al. |
| 5,526,263 A | 6/1996 | Tanaka et al. |
| 5,531,115 A | 7/1996 | Erdley |
| 5,570,304 A | 10/1996 | Mark et al. |
| 5,617,317 A * | 4/1997 | Ignagni ...................... 701/215 |
| 6,308,134 B1 * | 10/2001 | Croyle et al. ............... 701/220 |

FOREIGN PATENT DOCUMENTS

| | | |
|---|---|---|
| EP | 0181012 | 3/1990 |
| EP | 415681 | * 3/1991 |
| EP | 0636862 | 2/1995 |
| JP | 58009017 | 1/1983 |
| WO | WO9724582 | 7/1997 |
| WO | 9724582 | 7/1997 |

OTHER PUBLICATIONS

Pfeifer, L., "Orthogonalization of nonorthogonal vector components", Defense Mapping Agency, Washington, DC, Position Location and NAvigation Symposium, IEEE Plans '88, IEEE p. 553–559, Nov. 1998.*

Appendix A–E, pp. 400–413.

* cited by examiner

Primary Examiner—Ian J. Lobo
(74) Attorney, Agent, or Firm—Carlson, Gaskey & Olds

(57) ABSTRACT

A navigation system includes a multi-axis accelerometer which can be installed in the vehicle in any unknown orientation. The orientation of the axes of the accelerometer is automatically determined by the navigation system. The signals from the accelerometer are then used to propagate the position of the vehicle.

23 Claims, 7 Drawing Sheets

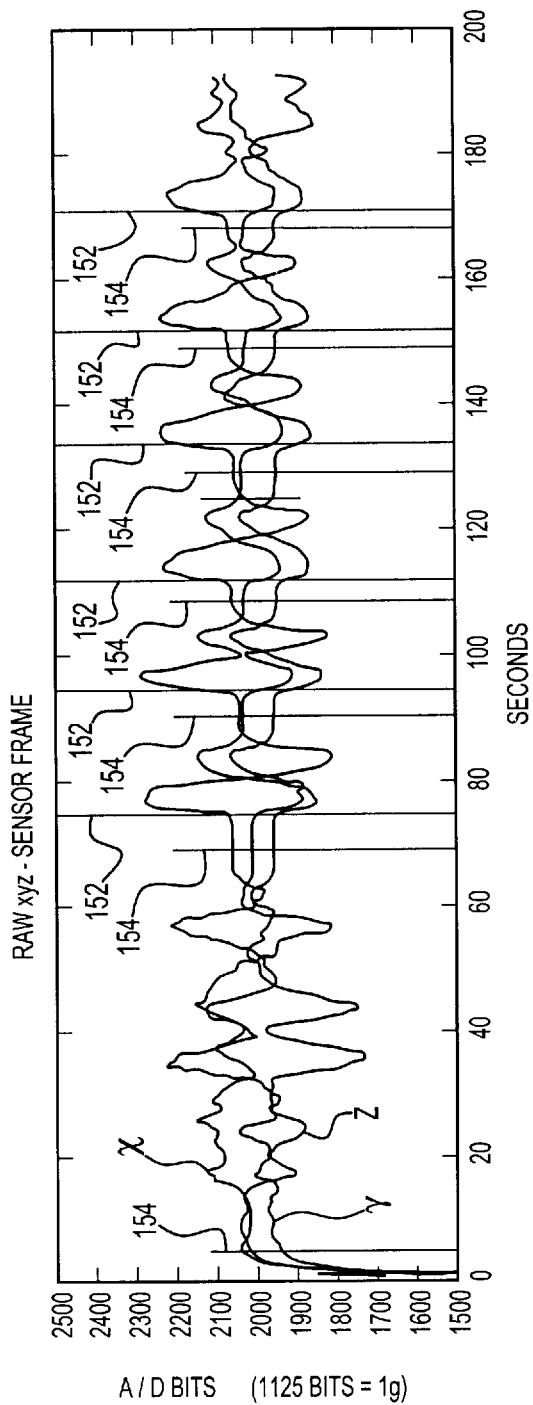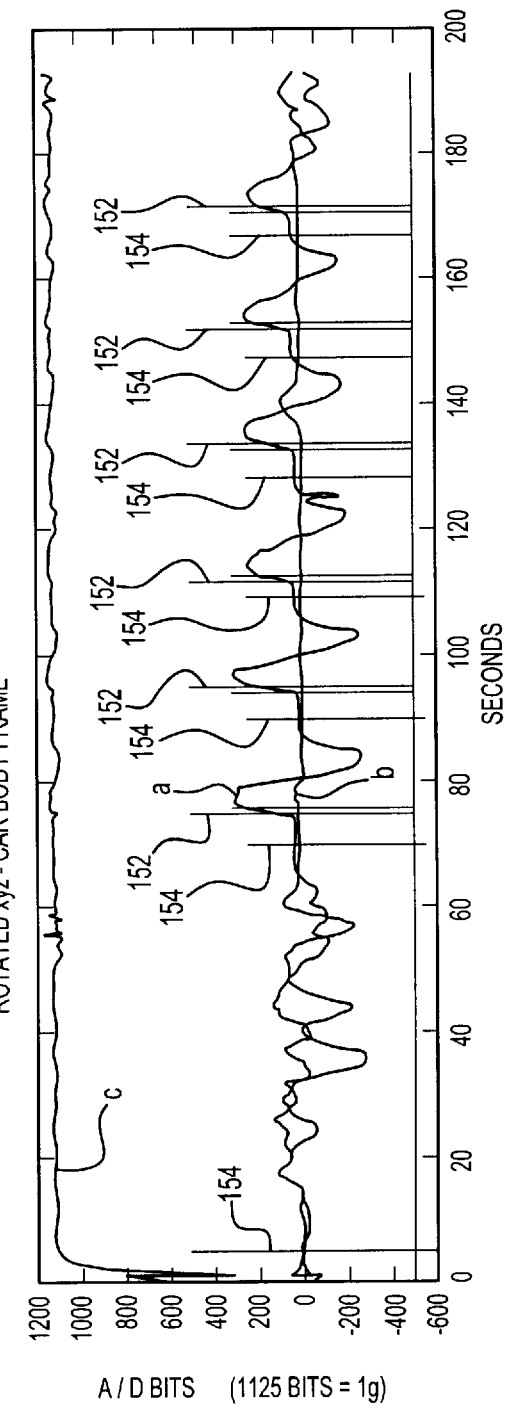

CALIBRATION OF MULTI-AXIS ACCELEROMETER IN VEHICLE NAVIGATION SYSTEM

BACKGROUND OF THE INVENTION

The present invention relates generally to vehicle navigation systems and more particularly to a system and method for calibrating accelerometers in the vehicle navigation system.

Some known vehicle navigation systems include inertial sensors or accelerometers, possibly in combination with other sensors, to provide dead-reckoning. One known navigation system includes an accelerometer suite comprising three orthogonally mounted accelerometers. The accelerometer provides acceleration signals in three mutually orthogonal axes. A first accelerometer is aligned vertically, i.e., with gravity. A second accelerometer is aligned with the longitudinal axis of the vehicle to provide a signal indicating forward and rearward acceleration, from which speed can be determined. A third accelerometer, mounted orthogonally to the other two, provides lateral acceleration information, which is used to indicate change in heading.

In the known navigation system, the accelerometers must be precisely aligned with the associated axes of the vehicle in order to provide accurate information. The accelerometer is mounted in a known orientation in the vehicle. Hardware, such as adjustment screws, is provided to fine tune the orientation of the three accelerometers to align the three accelerometers with the corresponding axes of the vehicle. Even after time-consuming adjustment, the accelerometers may not be properly aligned with the axes of the vehicle. The alignment may also change over time.

SUMMARY OF THE INVENTION

The present invention permits a multi-axis accelerometer suite to be installed in the vehicle in any unknown orientation. The navigation system learns the orientation of the accelerometer suite and propagates the position of the vehicle based upon the acceleration signals from the accelerometer after learning its orientation. The navigation system determines the orientation of the accelerometer relative to the vehicle and generates a transformation matrix. The transformation matrix transforms signals from the accelerometer suite reference frame to the vehicle reference frame. The transformed acceleration signals are then used to provide dead reckoning. More particularly, a forward acceleration signal is used to determine the speed of the vehicle, while a lateral acceleration signal indicates change in the current heading of the vehicle.

Generally, the accelerometer is installed into the vehicle in any orientation. Preferably, the vehicle is then run through a series of simple, pre-determined actions which permit the navigation system to quickly determine the orientation of the accelerometer relative to the vehicle. First, when the navigation system determines that the vehicle is stationary, such as by monitoring change in acceleration signals, the navigation system determines the orientation of the accelerometer relative to gravity. Since the only acceleration acting upon the accelerometer when the vehicle is still is gravity (at 1 g), the navigation system can quickly determine the orientation of the accelerometer relative to gravity.

Next, the vehicle undergoes a series of moderate forward accelerations, which indicate the orientation of the accelerometers relative to the longitudinal axis of the vehicle. Since acceleration due to gravity has already been determined and since there can be no lateral acceleration without forward velocity, any acceleration in the forward direction of the vehicle before significant velocity is achieved is almost completely in the longitudinal axis of the vehicle. In this manner, the orientation of the accelerometer relative to the longitudinal axis of the vehicle is determined.

The lateral axis of the vehicle is then taken to be the cross product of the gravity and longitudinal axes of the vehicle. DC biases of the accelerometer, in each axis, are also determined. The orientation of the accelerometer is repeatedly checked, and updated, if necessary.

BRIEF DESCRIPTION OF THE DRAWINGS

Other advantages of the present invention will be readily appreciated as the same becomes better understood by reference to the following detailed description when considered in connection with the accompanying drawings wherein:

FIG. 8a is a graph illustrating signals from the multi-axis accelerometer of FIG. 2; and FIG. 8b is a graph corresponding to FIG. 8a, illustrating the transformed acceleration signals.

DETAILED DESCRIPTION OF A PREFERRED EMBODIMENT

Figure 1:
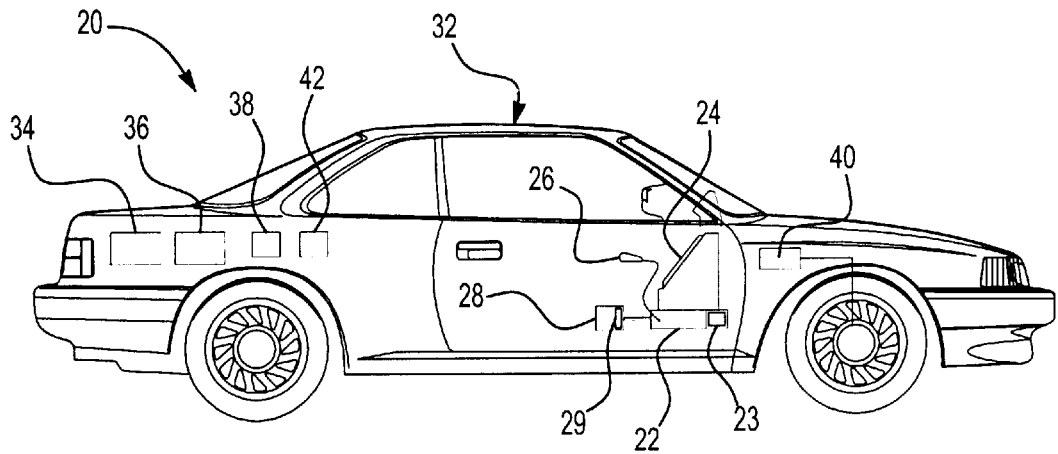
FIG. 1 is a schematic of the navigation system of the present invention installed in a vehicle.

The navigation system 20 of the present invention is shown schematically in FIG. 1. The navigation system 20 includes a CPU 22 having RAM 23 and connected to a display 24, such as a high resolution LCD or flat panel display. The CPU 22 is also connected to an input device 26 such as a mouse, keyboard, key pad, remote device or microphone. Alternatively, the display 24 can be a touch screen display. The navigation system 20 further includes a storage device 28, such as a hard drive 28 or CD ROM, connected to the CPU 22. The storage device 28 contains a database 29 including a map of all the roads in the area to be traveled by the vehicle 32 as well as the locations of potential destinations, such as addresses, hotels, restaurants, or previously stored locations. The software for the CPU 22, including the graphical user interface, route guidance, operating system, position-determining software, etc may also be stored in storage device 28 or alternatively in ROM or flash memory.

The navigation system 20 preferably includes position and motion determining devices, such as a GPS receiver 34, a gyroscope 36, a compass 38, a wheel speed sensor 40 and a multi-axis accelerometer 42, all connected to the CPU 22 (connections not shown for simplicity). Such position and motion determining devices are well known and are commercially available.

As is well known, the position and motion determining devices determine the position of the vehicle 32 relative to the database of roads utilizing dead-reckoning, map-matching, etc. Further, as is known in navigation systems, the user can select a destination relative to the database of roads utilizing the input device 26 and the display 24. The navigation system 20 then calculates and displays a recommended route directing the driver of the vehicle 32 to the desired destination. Preferably, the navigation system 20 displays turn-by-turn instructions on display 24, guiding the driver to the desired destination.

Figure 2:
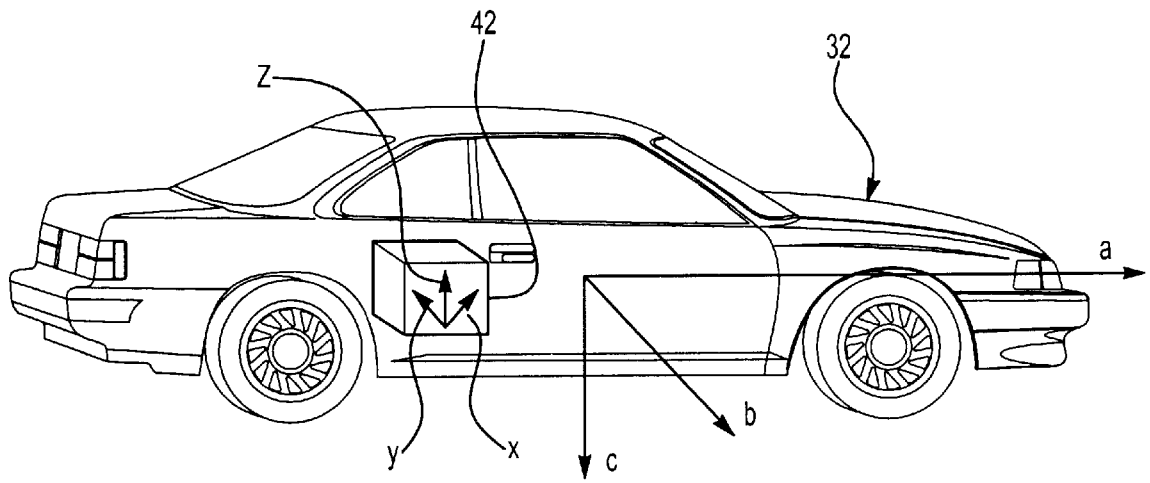
FIG. 2 is a perspective view of the vehicle and accelerometer of FIG. 1, with the accelerometer installed in an unknown orientation in the vehicle.

FIG. 2 illustrates the multi-axis accelerometer 42 having axes x, y, z installed in the vehicle 32 having a longitudinal axis a, a lateral axis b and a vertical axis c. The longitudinal axis a of the vehicle 32 is defined in the forward direction of the vehicle 32. The lateral axis b is orthogonal to both the longitudinal and vertical axes a, c and is defined to be in the right direction. The vertical axis c is orthogonal to the other axes a and b and is defined in the downward direction. The axes x, y, z of the accelerometer 42 are mutually orthogonal, but are in an orientation which may be completely unknown relative to the vehicle axes a, b, c. The navigation system 20 of the present invention automatically learns the orientation of the accelerometer 42 relative to the vehicle axes a, b, c and then utilizes signals from the accelerometer 42 to propagate the position of the vehicle 32. As will be described in more detail below, the navigation system 20 first determines the orientation of the accelerometer 42 relative to the vertical axis c of the vehicle 32 by comparing the orientation of the accelerometer 42 relative to gravity when the vehicle 32 is not moving. The navigation system 20 then determines the orientation of the accelerometer 42 relative to the longitudinal axis a of the vehicle 32 during forward acceleration of the vehicle 32. The orientation of the accelerometer 42 relative to the lateral axis b of the vehicle 32 is then simply the cross-product of the longitudinal and vertical axes a and c. The navigation system 20 generates a transformation matrix by which the signals in the accelerometer axes x, y, z are multiplied to produce acceleration signals in the vehicle axes a, b, c to propagate position.

Figure 3:
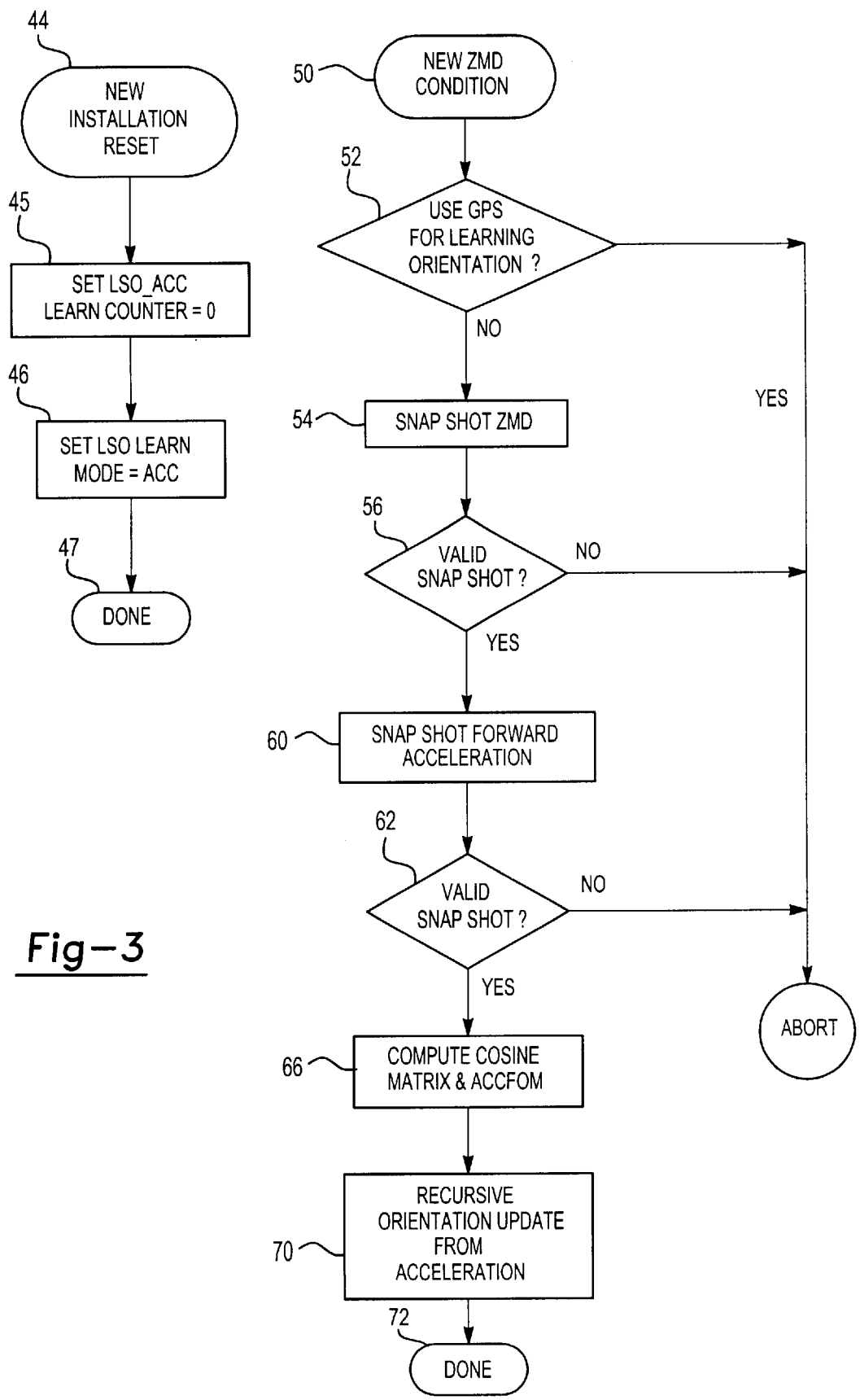
FIG. 3 is a flow chart showing one recursion of the steps for determining the sensor orientation.

Referring to FIG. 3, if the navigation system 20 is determined to be a new installation (i.e. never calibrated) or is manually reset in step 44, the "learn sensor orientation" recursion counter is reset to zero in step 45. Referring to FIGS. 2 and 3, although the accelerometer 42 is installed in an unknown orientation in the vehicle 32, the accelerometer 42 can still determine whether the vehicle 32 is in a zero motion state, by monitoring the magnitudes or change in magnitudes of the signals in the three accelerometer axes x, y, z. Preferably, this is done utilizing the method described in detail in co-pending U.S. patent application Ser. No. 08/579,903, entitled Zero Motion Detection System for Improved Vehicle Navigation System, assigned to the assignee of the present invention, and which is hereby incorporated by reference. Generally, however, it should be recognized that a zero motion determination (ZMD) can still be made even when the orientation of the accelerometer 42 is completely unknown relative to the vehicle 32. If the sum of the acceleration signals in the three axes x, y, z are below a given threshold, a zero motion determination can be made. Alternatively, if changes in each or all of the axes x, y, z are below a certain threshold for a certain period of time, a zero motion determination can also be made.

If a zero motion determination is made in step 50, the navigation system 20 determines whether to learn sensor orientation via comparisons to signals from the GPS system in step 52. If not, the navigation system 54 takes a snapshot of the zero motion state in step 54, i.e., it stores instantaneous acceleration signals from the three axes x, y, z. In step 56, the navigation system determines whether these signals represent a valid snapshot, i.e., whether the vehicle is still in a zero motion state. If so, a snapshot during forward acceleration is taken in step 60 and the orientation of the accelerometer 42 is determined relative to the longitudinal axis a of the vehicle 32. In step 62, it is determined whether the snapshot was valid, in a manner which will be described below. If so, in step 66 the cosine or transformation matrix is computed, as is the AccFOM. In step 70, recursive orientation updates from the acceleration information are performed and the navigation system 20 proceeds to step 72. It should be recognized that this process will be performed recursively to provide the more accurate determination of the orientation of the accelerometer 42 in the vehicle 32.

Figure 4:
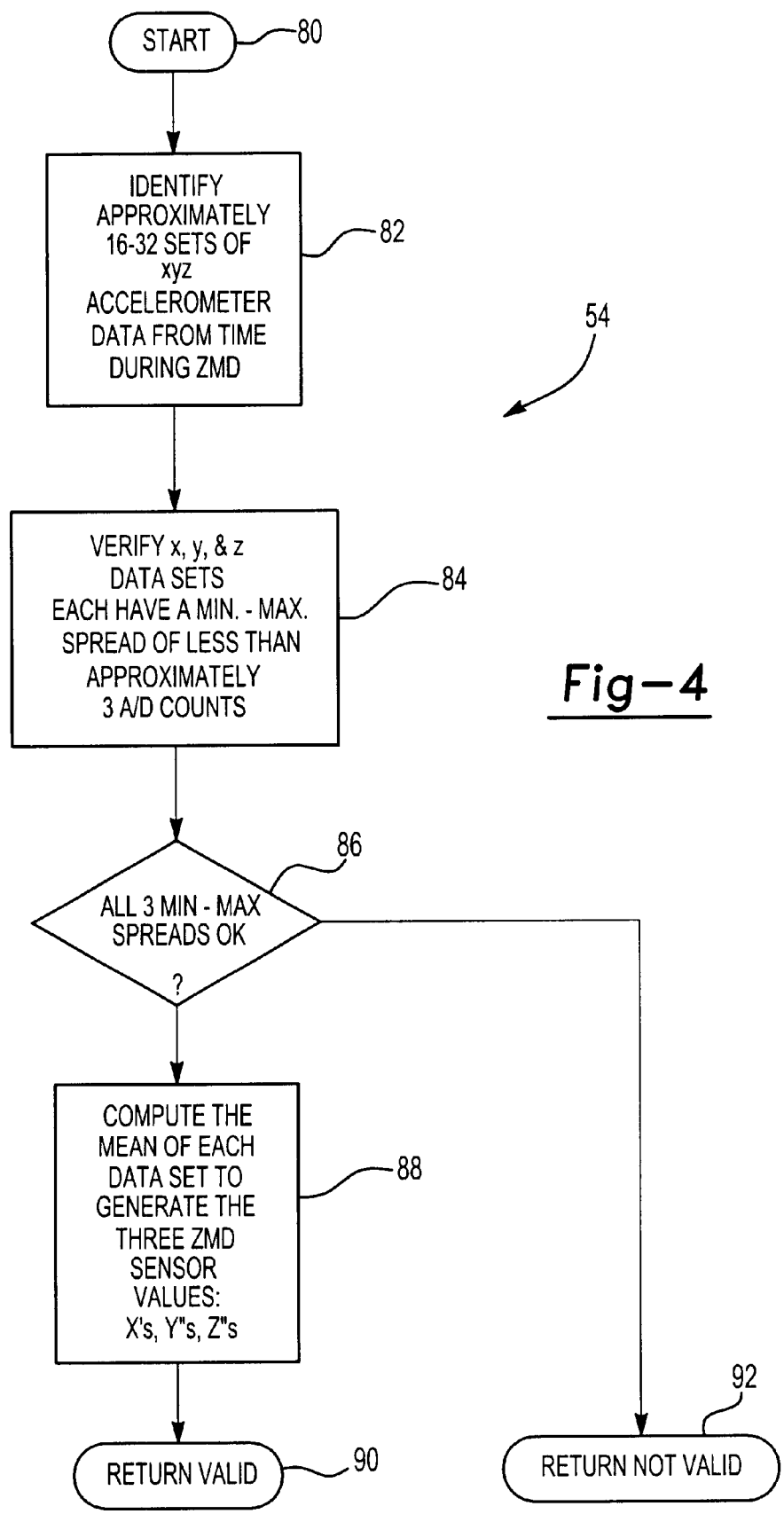
FIG. 4 is a flow chart showing the steps for taking a snapshot of a zero motion state.

FIG. 4 is a detailed flow chart of step 54 from FIG. 3. Snapshot ZMD starts in step 80. In step 82, the navigation system identifies and stores approximately 16 to 32 sets of accelerometer signals from the x, y, z axes during the zero motion state. In step 84, the navigation system 20 verifies that the signals from each accelerometer axes x, y, z have a range of signals less than a predetermined threshold, for example, three counts on an analog to digital converter. This is to ensure that the data is valid and that the zero motion state is still accurate.

If the x, y and z ranges are all less than the threshold in step 86, the mean of each data set (x, y, z) is computed to establish three ZMD sensor values: $x_s$, $y_s$, and $z_s$. The navigation system then returns to the flow chart of FIG. 3 in step 90. If the navigation system 20 determines in step 86 that any of the ranges for acceleration signals in any of the axes exceeds the threshold, the navigation system returns to the flow chart of FIG. 3 in step 92 to step 56 in FIG. 3 with an indication that the snapshot was not valid.

Figure 5:
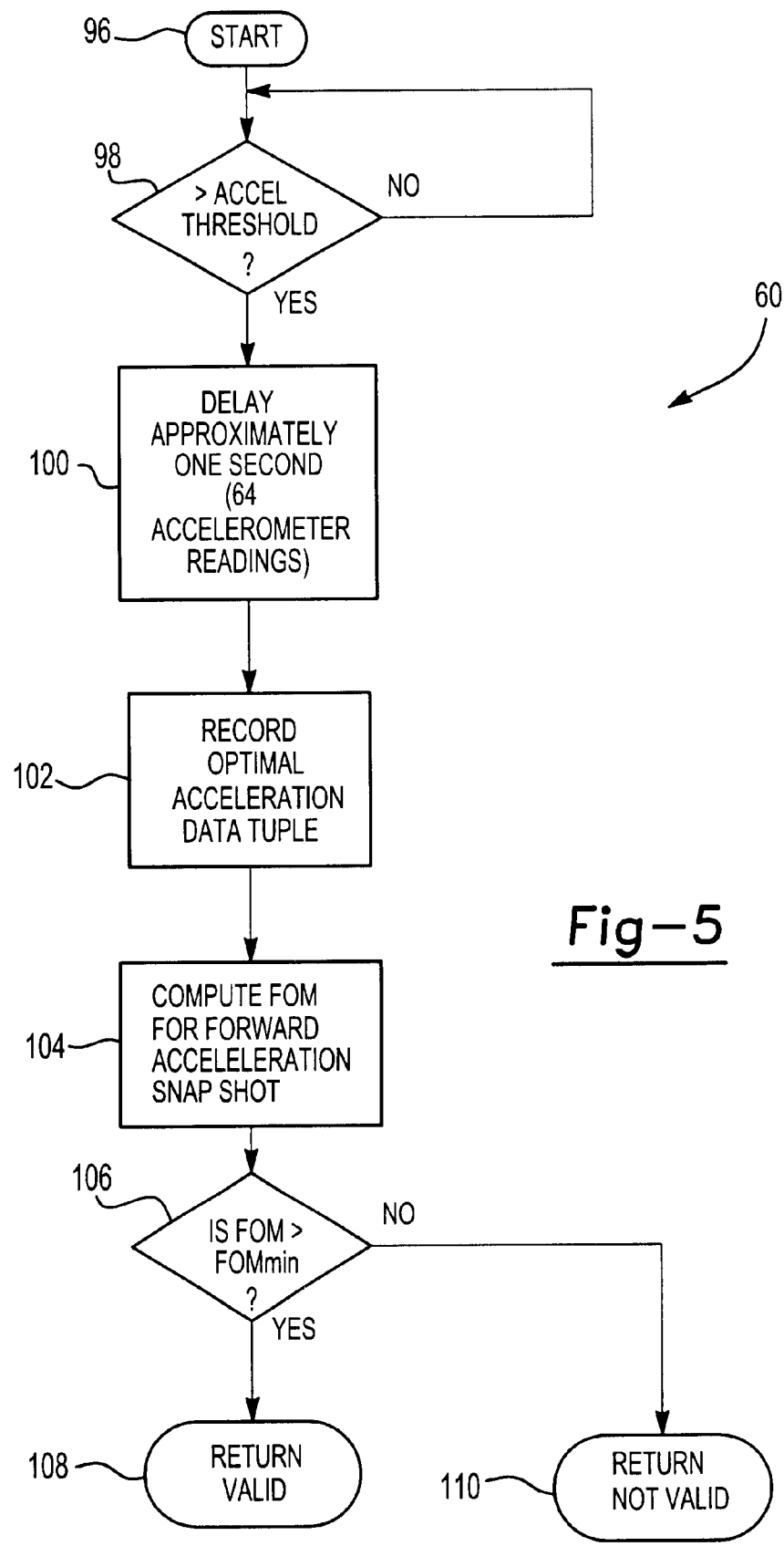
FIG. 5 is a flow chart illustrating the steps for taking a snapshot of forward acceleration.

FIG. 5 illustrates a more detailed flow chart of step 60 from FIG. 3. The snapshot of forward acceleration begins in step 96 and first determines whether the sum of the acceleration signals from the axes x, y, z exceed a predetermined threshold in step 98. When it does, the navigation system 20 delays for approximately one second in step 100 and then records acceleration data for the x, y, z axes in step 102, which is presumably occurring during a hard forward acceleration. In step 104, the navigation system 20 computes the FOM for the forward acceleration snapshot. In step 106, if the FOM is greater than a predetermined threshold, then the snapshot forward acceleration subroutine returns in step 108 to step 62 in FIG. 3 with an indication that the snapshot was valid. If the FOM is not greater than the predetermined threshold, then the snapshot forward acceleration subroutine 60 returns in step 110 to step 62 in FIG. 3 with an indication that the snapshot was not valid.

During the zero motion state, the vector sum of all three acceleration signals in the x, y, z axes should be exactly 1 g; however, the accelerometer 42 will include the DC sensor biases in each axis x, y, z. The change in acceleration during the hard forward acceleration will provide signals without sensor biases, since it is a change in acceleration. During the forward acceleration, it is assumed that there is no lateral acceleration, or at least that over mutliple learn cycles the mean lateral acceleration will be zero. In the vehicle 32, there can be no lateral acceleration without forward velocity. By taking a snapshot of the forward acceleration early in the acceleration from the zero motion state, there should be very little forward velocity and therefore negligible lateral acceleration. Further, during the initial calibration of the accelerometer 42, the vehicle 32 is preferably placed on a flat horizontal surface and undergoes a series of zero motion states and moderate to hard straightforward accelerations.

In step 66 (FIG. 3), the navigation system 20 generates a three by three transformation matrix ($C_{11} \times C_{33}$) based upon the steps above to transform the acceleration signals from the x, y, z axes to the vehicles a, b, c axes. Generally, the accelerometer axes x, y, z relate to the vehicle's axes a, b, c as follows:

$$\begin{bmatrix} C_{11} & C_{12} & C_{13} \\ C_{21} & C_{22} & C_{23} \\ C_{31} & C_{32} & C_{33} \end{bmatrix} \times \begin{bmatrix} x \\ y \\ z \end{bmatrix} = \begin{bmatrix} xC_{11} + yC_{12} + zC_{13} \\ xC_{21} + yC_{22} + zC_{23} \\ xC_{31} + yC_{32} + zC_{33} \end{bmatrix} = \begin{bmatrix} a \\ b \\ c \end{bmatrix}$$

The navigation system utilizes the data from the ZMD and the forward accelerations to create the transformation matrix. First, the ZMD sensor values $x_s$, $y_s$, $z_s$ are compared to an ideal vehicle ZMD matrix:

$$\begin{bmatrix} C_{11} & C_{12} & C_{13} \\ C_{21} & C_{22} & C_{23} \\ C_{31} & C_{32} & C_{33} \end{bmatrix} \times \begin{bmatrix} x_s \\ y_s \\ z_s \end{bmatrix} = \begin{bmatrix} a \\ b \\ c \end{bmatrix} = \begin{bmatrix} 0 \\ 0 \\ 1g \end{bmatrix}$$

Preferably, with the accelerometers used, the vector sum of all of three ZMD accelerometer signals should be exactly 1 g.

The forward acceleration accelerometer values $x_f$, $y_f$, $z_f$ are then compared to an ideal vehicle forward acceleration matrix:

$$\begin{bmatrix} C_{11} & C_{12} & C_{13} \\ C_{21} & C_{22} & C_{23} \\ C_{31} & C_{32} & C_{33} \end{bmatrix} \times \begin{bmatrix} x_f \\ y_f \\ z_f \end{bmatrix} = \begin{bmatrix} a \\ b \\ c \end{bmatrix} = \begin{bmatrix} \text{any positive} \\ 0 \\ 1g \end{bmatrix}$$

The above equations are solved to produce the transformation matrix. Since the gain of the accelerometers is known accurately, the DC biases of the three axes of the accelerometer are also compensated by the transformation matrix. It is assumed that there is zero mean pitch and roll during the ZMDs.

After the transformation matrix is generated, the navigation system 20 can use the acceleration signals from the three axes x, y, z of the accelerometer 42 to propagate the position of the vehicle 32 such as by dead reckoning. The acceleration signals are continuously multiplied by the transformation matrix to provide the acceleration data for the longitudinal, lateral and vertical axes of the vehicle 32. Generally, the forward velocity of the vehicle 32 and displacement is determined by the longitudinal acceleration signal over time while the heading of the vehicle 32 is determined based upon the lateral acceleration and velocity of the vehicle 32. Acceleration data from the vertical axis c of the vehicle is used to indicate elevation or pitch of the vehicle 32.

Figure 6:
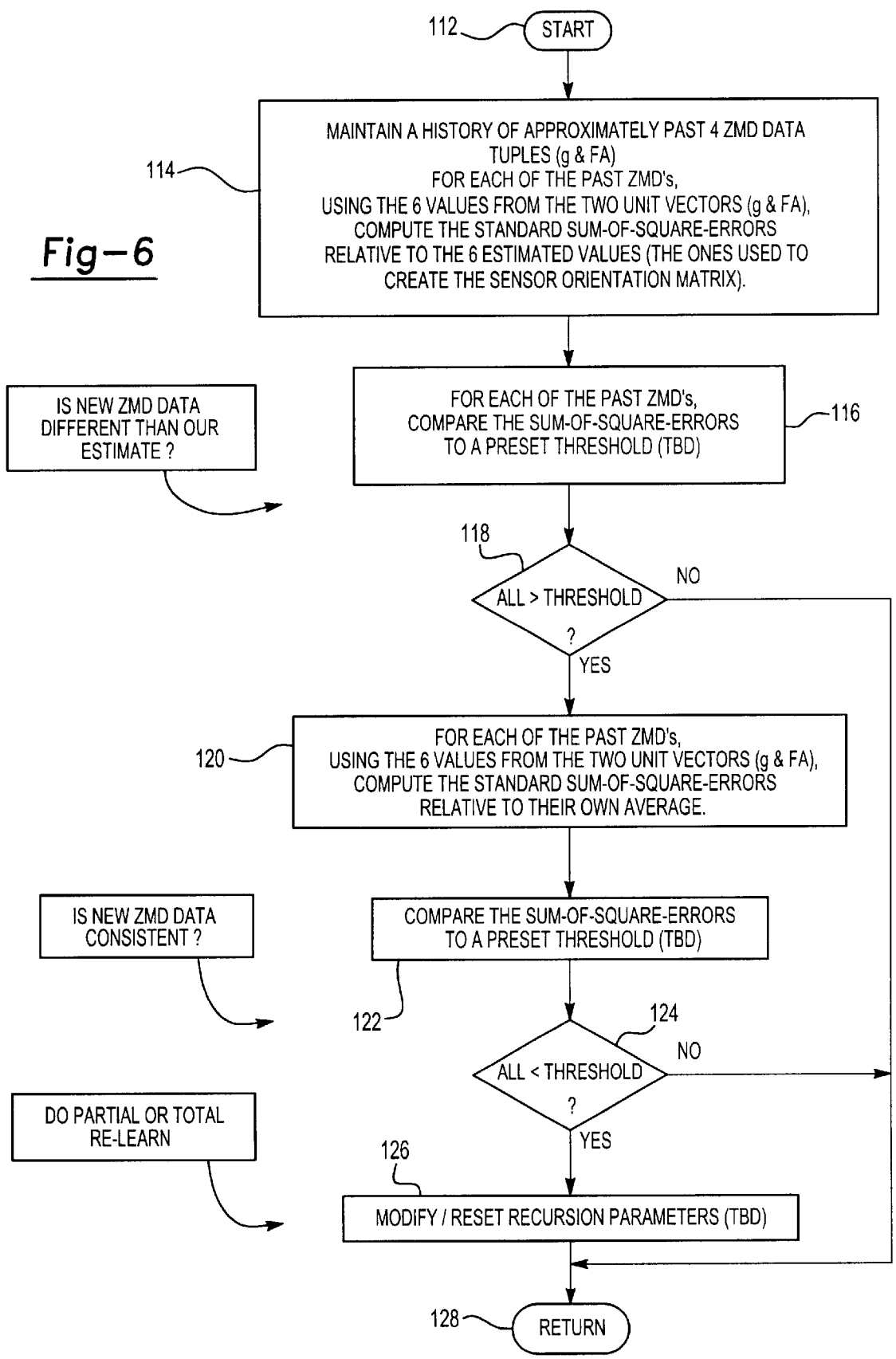
FIG. 6 is a flow chart illustrating the steps for checking a change in orientation.

The orientation of the accelerometer 42 is continuously checked according to the flow chart shown in FIG. 6. In step 114, the navigation system maintains data from the most recent four ZMD and forward acceleration snapshots and computes the standard sum of square errors relative to the six values from the two unit vectors (g and forward acceleration).

In step 116 for each of the past ZMDs, the sum of square errors is compared to a preset threshold. If they are all greater than the predetermined threshold in step 118, then the standard sum of square errors relative to their own average is computed using the six values from the two unit vectors (g and forward acceleration), for each of the past ZMDs.

In step 122, the sum of square errors is compared to a preset threshold. In step 124, if all of the sum of square errors are less than a predetermined threshold, then the recursion parameters must be modified or reset in step 126, providing a partial or total re-learn of the orientation. If the sum of square errors are not all less than a predetermined threshold in 124, the orientation change subroutine is returned in step 128, then no orientation change is determined.

Figure 7:
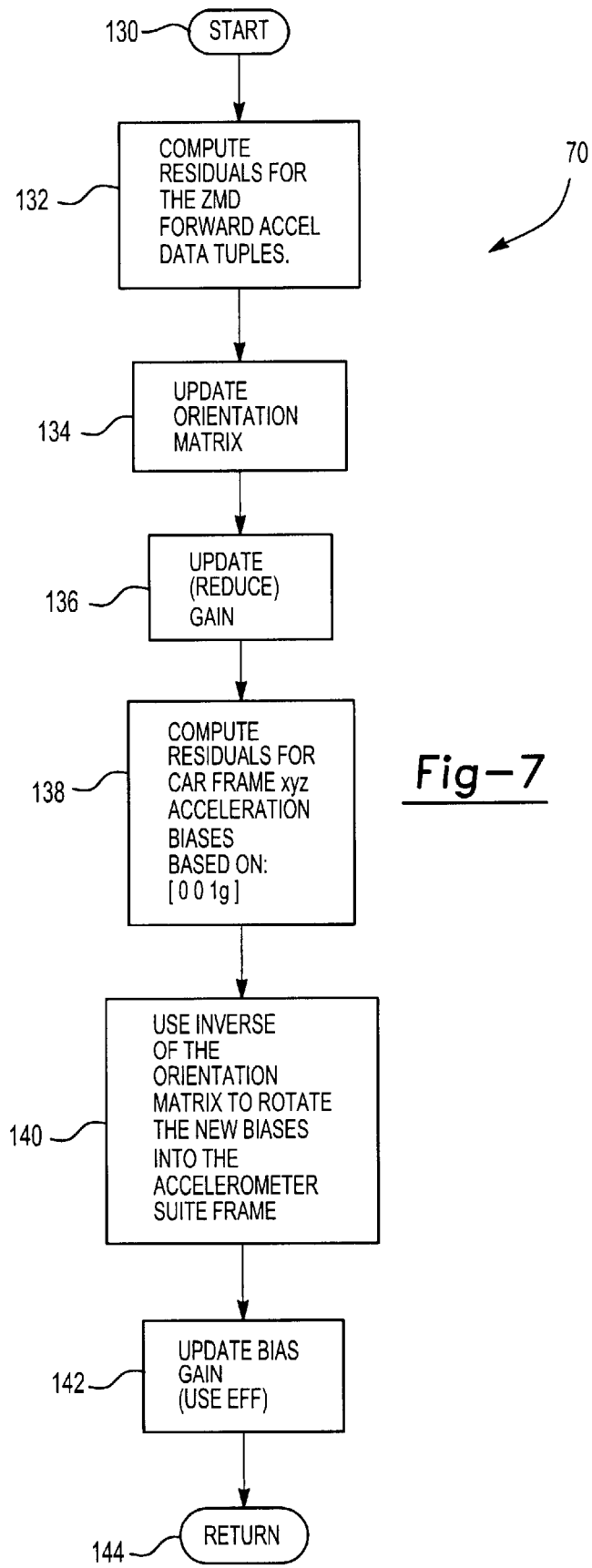
FIG. 7 is a flow chart illustrating the recursive orientation update.

FIG. 7 illustrates a flow chart for the recursive orientation update 70 of FIG. 3, which begins in step 130. In step 132, the residuals for the ZMD forward acceleration data sets are used to update the orientation matrix in step 134. The gain associated with each of the axes x, y, z is updated or reduced in step 136. In step 138, the residuals for the car frame acceleration biases are computed based upon 1 g of acceleration in the negative c direction.

In step 140, the inverse of the orientation matrix is used to rotate the new biases into the accelerometer suite frame. In step 142, the bias gain for the axes x, y, z of the accelerometer 42 is updated and a subroutine returns in step 144.

FIG. 8A illustrates a graph of the acceleration signals from the axes x, y, z of the accelerometer 42. Again, since this is only an example, and since the accelerometer 42 can be installed into the vehicle 32 in any orientation whatsoever, FIG. 8a is only an illustrative example, and may not coincide with the orientation shown in the other figures. FIG. 8A illustrates signals from the accelerometer 42 installed in an unknown orientation during a series of seven ZMDs and forward accelerations. Forward acceleration snapshots 152 of the signals x, y, z and ZMD snapshots 154 are also indicated. Again, for the accelerometers used in this example, 1125 bits of gain on the A/D converter indicates 1 g acceleration. Thus, on FIG. 8A, the vector sum of the signals x, y, z is in excess of 1125 bits during the ZMD snapshots 154 as a result of DC biases.

FIG. 8b indicates the transformed a, b, c data corresponding in time to the x, y, z signals of FIG. 8A. As can be seen in FIG. 8b, after the first ZMD 154, acceleration in the c axis is well-determined fairly quickly. The other signals a, b are not resolved until after the first forward acceleration snapshot 152 at approximately 75 seconds. Even after the first one or two forward acceleration snapshot 152 it can be seen that the a and b axes are well-resolved. The more accurately transformed signals a, b, c after approximately 75 seconds show a fairly constant vertical acceleration of 1 g, with some fluctuation due to pitch changes during forward accelerations.

During normal operation of the vehicle, the orientation of the accelerometer 42 in the vehicle 32 may be continuously checked and updated at the zero motion states. The navigation system 20 of the present invention provides an easy to install multi-axis accelerometer with improved accuracy.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle navigation system comprising:
   a multiple-axis inertial sensor generating a plurality of sensor signals, each associated with one of said sensor axes;
   a transformation matrix relating said plurality of signals to said vehicle axes; and
   a processor transforming said plurality of signals into motion information correlating to vehicle axes.

2. The vehicle navigation system of claim 1 further comprising means for generating said transformation matrix.

3. The vehicle navigation system of claim 2 further comprising means for determining an orientation of said sensor relative to gravity, said transformation matrix determined based upon said determination of said orientation relative to gravity.

4. The vehicle navigation system of claim 2 further comprising means for determining an orientation of said sensor relative to a longitudinal axis of a vehicle, said transformation matrix determined based upon said determination of said orientation relative to said longitudinal axis.

5. The vehicle navigation system of claim 4 further comprising means for determining the orientation of said sensor relative to gravity, said transformation matrix determined based upon said determination of said orientation relative to gravity.

6. A vehicle navigation system comprising:
   an inertial sensor generating a plurality of sensor signals each associated with a sensor axis of said sensor, said inertial sensor mounted in an unknown orientation in a vehicle;
   a processor programmed to determine a gravity orientation of said sensor relative to gravity and determining a longitudinal orientation of said sensor relative to a longitudinal axis of a vehicle; and
   means for propagating a position of a vehicle based upon said plurality of sensor signals, said gravity orientation and said longitudinal orientation.

7. The vehicle navigation system of claim 6 further comprising means for transforming said plurality of sensor signals from said sensor axes to axes of said vehicle.

8. A vehicle navigation system comprising:
   an inertial sensor generating a plurality of sensor signals each associated with a sensor axis of said sensor, said inertial sensor mounted in an unknown orientation in a vehicle;
   a transformation matrix relating said plurality of signals to axes of said vehicle; and
   means for propagating a position of a vehicle based upon said plurality of sensor signals.

9. The vehicle navigation system of claim 8 further comprising a processor programmed to generate said transformation matrix.

10. The vehicle navigation system of claim 9 wherein said processor is further programmed to determine an orientation of said sensor relative to gravity, said transformation matrix determined based upon said determination of said orientation relative to gravity.

11. The vehicle navigation system of claim 10 wherein said processor is further programmed to determine said orientation of said sensor relative to a longitudinal axis of a vehicle, said transformation matrix determined based upon said determination of said orientation relative to said longitudinal axis.

12. A method for calibrating an inertial sensor in a vehicle navigation system including the steps of:
    a) receiving a plurality of signals from said inertial sensor;
    b) generating a transformation matrix based upon said plurality of signals; and
    c) transforming said plurality of signals from said inertial sensor into a reference frame of the vehicle.

13. The method of claim 12 further including the steps of:
    mounting said inertial sensor in the vehicle in an unknown orientation relative to said vehicle; and
    determining said orientation of said inertial sensor relative to the vehicle based upon said plurality of signals.

14. The method of claim 13 wherein the inertial sensor is a multiple axis accelerometer, said method further including the steps of:
    d) determining a gravitational direction relative to the axes of the accelerometer; and
    e) transforming said plurality of signals in said step c) based upon said step d).

15. The method of claim 14 further including the steps of:
    determining that the vehicle is stationary; and
    performing said step d) while the vehicle is determined to be stationary.

16. The method of claim 15 further including the steps of:
    d) performing a predetermined maneuver with said vehicle;
    e) receiving said plurality of signals in said step a) during said step d); and
    f) determining the orientation of the sensor in the vehicle based upon said step e).

17. The method of claim 16 wherein said step d) further includes the step of accelerating the vehicle along a longitudinal axis.

18. The method of claim 17 further including the steps of:
    determining the orientation of the sensor relative to a longitudinal axis of the vehicle;
    determining the orientation of the sensor relative to gravity; and
    determining the orientation of the sensor relative to a lateral axis of the vehicle, generally orthogonal to the longitudinal axis and gravity.

19. The method of claim 18 further including the steps of propagating a position of the vehicle based upon the transformed signals from said step c).

20. A method for calibrating an inertial sensor mounted in an unknown orientation in a vehicle navigation system including the steps of:
    a) determining a gravity orientation of the inertial sensor relative to gravity based upon a first plurality of signals from the sensor;
    b) determining a longitudinal orientation of the inertial sensor relative to a longitudinal axis of the vehicle based upon a second plurality of signals from the inertial sensor; and c) transforming a third plurality of signals from said inertial sensor into a reference frame of the vehicle.

21. The method of claim 20 further including the steps of:

determining that the vehicle is stationary; and performing said step a) while the vehicle is determined to be stationary.

22. The method of claim 21 further including the steps of:

d) performing a predetermined maneuver with said vehicle;

e) receiving said second plurality of signals during said step d); and f) determining the orientation of the sensor in the vehicle based upon said step e).

23. The method of claim 22 wherein said step d) further includes the step of accelerating the vehicle along the longitudinal axis of the vehicle.

* * * * *